Sept. 15, 1959     P. J. KRAAYEVELD ET AL     2,904,690
DEVICE FOR DETERMINING THE RELATIVE DEVIATION
IN PERCENT OF THE MEAN FREQUENCIES
OF PULSE SOURCES
Filed Dec. 22, 1955

INVENTOR
PIETER JOHANNES KRAAYEVELD
ANDRIES JACOBUS KEMPER
BY
AGENT

United States Patent Office 2,904,690
Patented Sept. 15, 1959

2,904,690

DEVICE FOR DETERMINING THE RELATIVE DEVIATION IN PERCENT OF THE MEAN FREQUENCIES OF PULSE SOURCES

Peter J. Kraayeveld and Andries J. Kemper, Amsterdam, Netherlands, assignors, by mesne assignments, to North American Philips Company, Inc., New York, N.Y., a corporation of Delaware Application December 22, 1955, Serial No. 554,822

Claims priority, application Netherlands December 31, 1954

9 Claims. (Cl. 250—83.3)

This invention relates to circuit arrangements for determining the relative deviation in percent of the mean frequencies of pulse sources. The term "pulse sources" is to be understood in this case to include all apparatus producing periodic, statistic or irregular pulses of constant amplitude.

In accordance with the present invention, the pulses derived from a first pulse source are supplied via a rectifier circuit to a capacitor, and the pulses derived from a second pulse source are also supplied via a rectifier circuit, but in the opposite sense, to said capacitor, provision being made of means for determining the potential across the capacitor or utilizing it for control purposes.

It is to be noted that it is known to bring about summation of pulses by supplying the pulses via a rectifier circuit to a capacitor in such manner that the capacitor is charged in a stepwise manner. In such case, means are provided for discharging the capacitor at a given potential, a relay being energized for actuating a mechanical summation device.

It is also known to bring about frequency measurements in a similar manner. In such case, the capacitor is charged in a stepwise manner via a rectifier circuit from a voltage source of constant known frequency. The capacitor is shunted by a discharge tube controlled by a voltage of unknown frequency.

The first rectifier circuit in the circuit arrangement of the invention may comprise two rectifiers connected in series, one series of pulses being supplied via a capacitor to the junction between the cathode of one rectifier and the anode of the other. A source of biassing potential is included between the series-combination of rectifiers and a point of constant potential. The second rectifier circuit is of a similar design, but the rectifiers and the biassing potential source have opposite polarities.

In order that the invention may be readily carried into effect, it will now be described, by way of example, with reference to the accompanying drawing, wherein.

Figure 1:
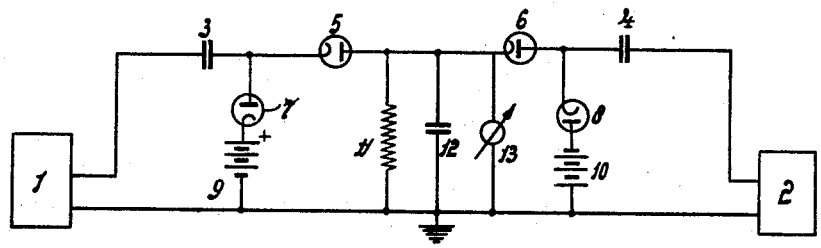
Fig. 1 is a schematic diagram of an embodiment of the circuit arrangement of the present invention.

In Fig. 1, reference numeral 1 indicates a pulse source. The mean repetition frequency of the pulses derived from the source 1 is assumed to be $n_1$. Furthermore, provision is made of a pulse source 2, producing pulses of the mean frequency $n_2$. The circuit arrangement is intended to provide an indication of the difference in percent between the frequencies $n_1$ and $n_2$.

The pulses of source 1 are supplied via a capacitor 3 to the cathode of a diode 5 and to the anode of a diode 7. The anode of diode 5 is connected to one terminal of a capacitor 12, which may have a resistor 11 connected parallel thereto. The cathode of diode 7 is connected via a biassing potential source 9, which gives the cathode a positive biassing potential, to a point of constant potential, in general to ground. The other terminal of capacitor 12 and, if desired, the resistor 11 are also connected to the point of constant potential.

The pulses provided by the source 2 are supplied in a similar manner via a capacitor 4 to diodes 6 and 8, which are connected in a different sense with respect to the diodes 5 and 7. The biassing potential source 10 is connected in opposite polarity from that of the source 9.

The circuit arrangement operates as follows:

The amplitude $h$ of a voltage applied to the input terminals at the left is obtained $n_1$ times per second. The capacitor 3, having a capacity C, is thus charged $n_1$ times per second to a voltage $h-b$, if $b$ represents the voltage of the source 9. If $V$ is the voltage of capacitor 12, a charge $n_1 C(h-b-V)$ Coulomb per second is transferred to said capacitor. If a voltage of an amplitude $h$ applied to the input terminals at the right is also obtained $n_2$ times per second, a charge $n_2 C(h-b+V)$ Coulomb per second is extracted from capacitor 12. A charge of $V/R$ Coulomb flows per second through resistor 11 having a value R. If the meter 13 indicates equilibrium, then $n_1 C(h-b-V) = V/R + n_2 C(h-b+V)$. From this it follows that $$V = (h-b)\frac{RC(n_2-n_1)}{1+RC(n_1+n_2)}$$

If $RC(n_1+n_2) \gg 1$, which is always possible by giving R a sufficiently high value, and if $n_1 = n$, $n_2 = n \pm n$, then $$\Delta V = \frac{(h-b)}{2} \cdot \frac{n}{n+\frac{n}{2}}$$

If $\Delta n$ is not unduly high with respect to $n$, so that $$\frac{\Delta n}{2} \gg n$$

then $$V = \langle \frac{n}{n}$$

The indication of the meter is thus a direct measure of the deviation in percent.

It is not necessary for the amplitude $h$ to be equal on each side. Calculation shows that it suffices to choose $(h_1-b_1)C_1$ to be equal to $(h_2-b_2)C_2$. However, this is at the expense of sensitivity, but the linearity is improved. If, for example, $$C_2 > C_1, \text{ then } \frac{C_1}{C_1+C_2} \cdot \frac{1}{2}$$

Now $$V(h_1-b_1)\frac{C_1}{C_1+C_2} \cdot \frac{\Delta n}{n} \cdot \frac{1}{1+\frac{\Delta n}{n} \cdot \frac{C_1}{C_1+C_2}}$$

Assuming for a moment that the resistor 11 has an infinite value, the mean direct currents in the biassing potential sources 9 and 10 are equal. This may be recognized when considering that there is only one direct current circuit comprising the elements 10, 8, 6, 5, 7, 9. From this it follows that the biassing potential sources 9 and 10 may be replaced by resistors 14 and 16, shunted by capacitors 15 and 17, respectively. These elements may also be included in the direct-current circuit at any arbitrary place.

Figure 2:
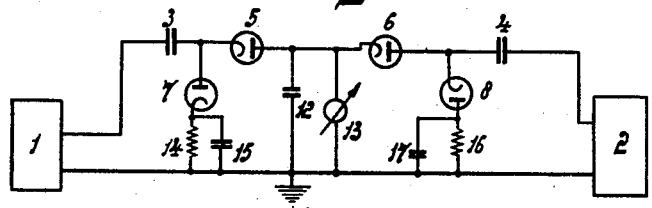
Fig. 2 is a modification of the embodiment of Fig. 1.
Figure 3:
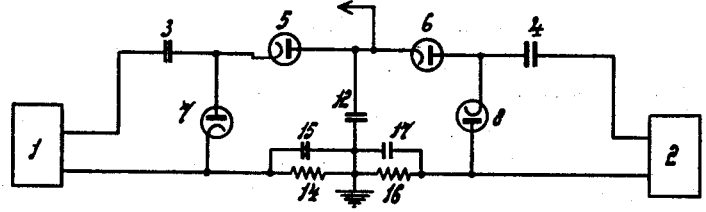
Fig. 3 is a further modification of the embodiment of Fig. 1.
Figure 4:
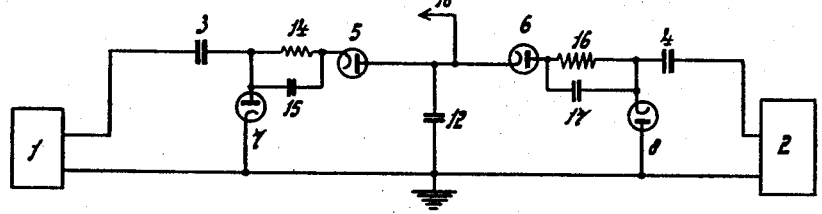
Fig. 4 is a modification of the embodiment of Fig. 3.

The foregoing is clarified in Figs. 2, 3 and 4, which are modifications of the embodiment of Fig. 1. In Fig. 2, the biassing potential source 9 of Fig. 1 is replaced by an RC circuit 14, 15 and the biasing potential source 10 is replaced by an RC circuit 16, 17. This is also the case in Fig. 3, wherein the biasing circuits are included only in the charging and discharging circuits of the capacitor 12. Fig. 4 is a modification of the embodiment of Fig. 3, wherein the biasing circuit 14, 15 is interposed between the cathode of the rectifier 5 and the anode of the rectifier 7 and the biasing circuit 16, 17 is interposed between the anode of the rectifier 6 and the cathode of the rectifier 8. As will be seen from Figs. 3 and 4, the capacitor 12 may have derived from it, at 18, a voltage which serves to control a device (not shown) which may be used for several purposes.

The invention may advantageously be used in measurements in which the ratio in strength between two beams of α- or β-rays (if desired α- or X-rays) is to be determined.

In the so-called absorption thickness meter, which is used for determining the thickness of a metallic or non-metallic layer, use is made of two radioactive sources of radiation which may be either natural or artificial, two radiation detectors serving as the pulse sources, e.g. sources 1 and 2, and two pieces of material of standard thickness. The materials are arranged between the sources of radiation and the radiation detectors. By varying, for example, the intensity of one source by means of a diaphragm, the amount of detected radiation may be made equal in each detector. Part of the radiation is absorbed in the materials, the absorption being greater as the material is thicker. One of the standard materials is then replaced by the material to be measured, which has a somewhat different thickness, and the associated detector detects a different amount of radiation. It may be indicated experimentally or theoretically how much difference in thickness corresponds to the radiation.

The detected radiation is dependent upon the absolute strength of the sources, which may have determined half-time values, so that the detected radiation decreases with time. The detected radiation is also dependent upon pressure and the state of humidity of the atmosphere. Such dependencies may be eliminated by measuring the deviation in percent instead of the absolute difference.

It will be evident that the material, the thickness of which is to be measured, may be produced by a roller or a calender. In the case of quick-running rollers, the mean value of a large piece of material is determined. Furthermore, the source and the detector may in many cases be moved to and fro over the width of the material.

In the so-called back-scattering thickness meter, the source and the detector are positioned on the same side of the material. In such case, the reflected or scattered radiation, which is more or less proportional to the thickness of the material, is measured.

If, in the circuit described, a voltage is set up across capacitor 12 such that the rejection limit of the material is approximated, this voltage may be utilized for correction of the material production operation.

The methods described above are not sufficient for tubular material manufactured, for example, by extrusion, since a certain inadmissible eccentricity between the inner and outer diameters may then occur.

In such case, a piston inside the tube may be provided with a radioactive source of radiation emitting a homogeneous radial radiation, while three radiation detectors A, B and C spaced 120 degrees from each other may be arranged outside the tube. The circuit comprises three rectifier circuits, of the above-described kind, by means of which the differences in percent between A and B, B and C, and C and A are measured. If all these differences are zero, the walls of the material may be assumed to be of uniform thickness. Three radial directions of movement are imparted to the piston preferably in the direction of the detectors. The piston operation may be corrected by means of the three voltages developed across the three capacitors 12.

It has been found that the circuit arrangement of the present invention may readily operate satisfactorily up to at least 10 megacycles per second. Consequently, this circuit may be utilized for maintaining constancy of the central frequency of transmitters modulated in frequency. If the first pulse source, e.g. source 1, is a crystal oscillator and the second pulse source, e.g. source 2, is a transmitter modulated in frequency, a direct voltage is set up at capacitor 12, which is proportional to the difference in percent between the frequencies. Furthermore, a low-frequency alternating voltage is set up at capacitor 12, which provides a faithful image of the low-frequency modulation of the frequency-modulated transmitter.

The direct voltage may serve to control the central frequency in such manner that it becomes substantially equal to the frequency of the crystal oscillator. The alternating voltage may be used to bring about negative feedback of the modulator.

A low-frequency signal balanced with respect to ground may be derived from each of the biasing potential sources, the capacitors 15 and 17 then being so proportioned as to have a substantially negligible impedance for the carrier-wave frequency and a comparatively high impedance for the modulation frequency.

While the invention has been described by means of specific examples and in specific embodiments, we do not wish to be limited thereto, for obvious modifications will occur to those skilled in the art without departing from the spirit and scope of the invention.

What is claimed is:

1. A circuit arrangement for determining the percentage deviation between the mean frequencies of two pulse sources, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for applying the output of said first pulse source across said third capacitor through said first capacitor and said first rectifier circuit, and means for applying the output of said second pulse source across said third capacitor through said second capacitor and said second rectifier circuit thereby to produce a voltage across said third capacitor which is indicative of the percentage deviation between the mean frequencies of said two pulse sources.

2. A circuit arrangement for determining the percentage deviation between the mean frequencies of two pulse sources, said pulse sources comprising radiation detectors, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for applying the output of said first pulse source across said third capacitor through said first capacitor and said first rectifier circuit, and means for applying the output of said second pulse source across said third capacitor through said second capacitor and said second rectifier circuit thereby to produce a voltage across said third capacitor which is indicative of the percentage deviation between the mean frequencies of said two pulse sources.

3. A circuit arrangement for determining the percentage deviation between the mean frequencies of two pulse sources, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means comprising a source of potential and a resistor connected in shunt across said third capacitor, the biasing means for said first rectifier circuit being of opposite polarity from that of said second rectifier circuit, means for applying the output of said first pulse source across said third capacitor through said first capacitor and said first rectifier circuit, and means for applying the output of said second pulse source across said third capacitor through said second capacitor and said second rectifier circuit thereby to produce a voltage across said third capacitor which is indicative of the percentage deviation between the mean frequencies of said two pulse sources.

4. A circuit arrangement for determining the percentage deviation between the mean frequencies of two pulse sources, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for applying the output of said first pulse source across said third capacitor through said first capacitor and said first rectifier circuit, means for applying the output of said second pulse source across said third capacitor through said second capacitor and said second rectifier circuit thereby to produce a voltage across said third capacitor which is indicative of the percentage deviation between the mean frequencies of said two pulse sources, and voltage indicating means connected in shunt across said third capacitor.

5. A circuit arrangement for determining the percentage deviation between the mean frequencies of two pulse sources, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means comprising resistors and capacitors in parallel circuit arrangement with said resistors, the biasing means for said first rectifier circuit being of opposite polarity from that of said second rectifier circuit, means for applying the output of said first pulse source across said third capacitor through said first capacitor and said first rectifier circuit, and means for applying the output of said second pulse source across said third capacitor through said second capacitor and said second rectifier circuit thereby to produce a voltage across said third capacitor which is indicative of the percentage deviation between the mean frequencies of said two pulse sources.

6. A circuit arrangement for determining the percentage deviation between the central frequency of a frequency modulated electrical signal transmitter and the frequency of a reference oscillator, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for applying the output of said transmitter across said third capacitor through said first capacitor and said first rectifier circuit, and means for applying the output of said reference oscillator across said third capacitor through said second capacitor and said second rectifier circuit thereby to produce a direct voltage component across said third capacitor which is indicative of the percentage deviation between the central frequency of said transmitter and the frequency of said reference oscillator and an alternating voltage component which is indicative of the low frequency modulation of said transmitter.

7. A circuit arrangement for determining the percentage deviation between the central frequency of a frequency modulated electrical signal transmitter and the frequency of a reference oscillator, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means comprising resistors and capacitors in parallel circuit arrangement with said resistors, the biasing means for said first rectifier circuit being of opposite polarity from that of said second rectifier circuit, means for applying the output of said transmitter across said third capacitor through said first capacitor and said first rectifier circuit, and means for applying the output of said reference oscillator across said third capacitor through said second capacitor and said second rectifier circuit thereby to produce a direct voltage component across said third capacitor which is indicative of the percentage deviation between the central frequency of said transmitter and the frequency of said reference oscillator and an alternating voltage component which is indicative of the low frequency modulation of said transmitter.

8. A circuit arrangement for determining the percentage deviation between the central frequency of a frequency modulated electrical signal transmitter and the frequency of a reference oscillator, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for applying the output of said transmitter across said third capacitor through said first capacitor and said first rectifier circuit, means for applying the output of said reference oscillator across said third capacitor through said second capacitor and said second rectifier circuit whereby to produce a direct voltage component across said third capacitor which is indicative of the percentage deviation between the central frequency of said transmitter and the frequency of said reference oscillator and an alternating voltage component which is indicative of the low frequency modulation of said transmitter, means for adjusting the central frequency of said transmitter in accordance with the magnitude of said direct voltage component, and means for producing negative feedback in the modulator of said transmitter in accordance with said alternating voltage component.

9. A circuit arrangement for determining the percentage deviation between the central frequency of a frequency modulated electrical signal transmitter and the frequency of a reference oscillator, comprising first and second capacitors, first and second rectifier circuits each comprising two rectifiers connected together to conduct in the same direction, a third capacitor connected in common across said first and second rectifier circuits, means for biasing said first and second rectifier circuits in a non-conducting direction for a discontinuous charge or discharge of said third capacitor, said biasing means for said first rectifier circuit being of opposite polarity from that of said second rectifier circuit, means for deriving a balanced low frequency signal from said biasing means, means for applying the output of said transmitter across said third capacitor through said first capacitor and said first rectifier circuit, and means for applying the output of said reference oscillator across said third capacitor through said second capacitor and said second rectifier circuit thereby to produce a direct voltage component across said third capacitor which is indicative of the percentage deviation between the central frequency of said transmitter and the frequency of said reference oscillator and an alternating voltage component which is indicative of the low frequency modulation of said transmitter.

References Cited in the file of this patent

UNITED STATES PATENTS

| | | |
|---|---|---|
| 2,264,725 | Shoupp et al. | Dec. 2, 1941 |
| 2,467,812 | Clapp | Apr. 19, 1949 |
| 2,647,214 | Penney et al. | July 28, 1953 |
| 2,744,697 | Van Allen | May 8, 1956 |